(12) United States Patent
Guzman

(10) Patent No.: US 10,670,120 B2
(45) Date of Patent: Jun. 2, 2020

(54) INFINITELY VARIABLE TRANSMISSION EMBODIED IN A SEMI PLANETARY CONFIGURATION

(71) Applicant: Camilo Ernesto Guzman, Laval (CA)

(72) Inventor: Camilo Ernesto Guzman, Laval (CA)

( * ) Notice: Subject to any disclaimer, the term of this patent is extended or adjusted under 35 U.S.C. 154(b) by 10 days.

(21) Appl. No.: 16/214,110

(22) Filed: Dec. 9, 2018

(65) Prior Publication Data

US 2019/0107182 A1 Apr. 11, 2019

Related U.S. Application Data

(63) Continuation-in-part of application No. 15/460,819, filed on Mar. 16, 2017, now abandoned.

(51) Int. Cl.
*F16H 15/50* (2006.01)
*F16H 37/08* (2006.01)
*F16H 55/20* (2006.01)
*F16H 57/033* (2012.01)
*F16H 3/72* (2006.01)

(52) U.S. Cl.
CPC ........... *F16H 15/506* (2013.01); *F16H 3/721* (2013.01); *F16H 37/084* (2013.01); *F16H 37/0833* (2013.01); *F16H 55/20* (2013.01); *F16H 57/033* (2013.01); *F16H 2037/088* (2013.01)

(58) Field of Classification Search
None
See application file for complete search history.

(56) References Cited

U.S. PATENT DOCUMENTS

| | | | | |
|---|---|---|---|---|
| 1,765,948 A | * | 6/1930 | Sheridan | B60K 17/10 475/93 |
| 2,163,339 A | * | 6/1939 | Hotton | F16H 3/722 475/100 |
| 2,165,934 A | * | 7/1939 | Mealey | F16D 67/00 475/93 |
| 2,198,398 A | * | 4/1940 | Szekely | F16H 3/722 475/105 |
| 2,263,707 A | * | 11/1941 | Strigl | F16H 61/02 477/94 |
| 2,330,375 A | * | 9/1943 | Orner | F16H 3/722 475/96 |
| 2,565,551 A | * | 8/1951 | Dougherty | F16H 47/12 475/72 |
| 2,596,231 A | * | 5/1952 | Frost | F16H 3/722 475/106 |
| 2,855,804 A | * | 10/1958 | Euler | F16D 67/00 475/48 |

(Continued)

FOREIGN PATENT DOCUMENTS

EP 1284376 A4 * 8/2008 ............. F16H 47/04

*Primary Examiner* — Dirk Wright

(57) ABSTRACT

An infinitely variable transmission capable of shifting from infinity to zero speed ratios in forward and reverse is provided. The transmission offers reciprocal blocking and supports high torque and power, while requiring a fixed number of planetary gears and a hydraulic flow control, without brakes and/or clutch by varying the angular displacement or rotational movement separating the contained vectors (speed and torque) to exploit, in a reciprocal manner, the working flow by maintaining the full potential of the movement force source without a continuity flow break-up.

6 Claims, 2 Drawing Sheets

(56) References Cited

U.S. PATENT DOCUMENTS

| | | | | | |
|---|---|---|---|---|---|
| 3,063,309 | A | * | 11/1962 | Grattan | F16H 3/663 475/60 |
| 3,079,813 | A | * | 3/1963 | Quigley | F16H 3/722 477/51 |
| 3,159,058 | A | * | 12/1964 | Zierick | F16D 67/00 475/93 |
| 3,240,083 | A | * | 3/1966 | Stoddard | F16H 3/722 475/94 |
| 4,625,588 | A | * | 12/1986 | Brickley | F16H 37/084 475/325 |
| 5,415,597 | A | * | 5/1995 | Ra | F16H 47/085 475/59 |
| 5,484,349 | A | * | 1/1996 | Ra | F16H 47/085 475/275 |
| 5,645,506 | A | * | 7/1997 | Mleczko | F16H 3/722 475/104 |
| 6,634,976 | B1 | * | 10/2003 | Britt | F16H 3/722 475/198 |
| 6,800,045 | B1 | * | 10/2004 | Staver | F16H 3/721 475/104 |
| 7,384,362 | B2 | * | 6/2008 | Jo | F16H 3/74 475/219 |
| 8,152,673 | B2 | * | 4/2012 | Yanay | F16H 3/722 475/91 |
| 8,708,360 | B2 | | 4/2014 | Miller et al. | |
| 8,905,893 | B2 | * | 12/2014 | Vedeneev | F16H 3/74 475/330 |
| 9,239,099 | B2 | | 1/2016 | Carter et al. | |
| 9,903,450 | B2 | | 2/2018 | Thomassy et al. | |
| 10,030,751 | B2 | | 7/2018 | Taskiran et al. | |

* cited by examiner

INFINITELY VARIABLE TRANSMISSION EMBODIED IN A SEMI PLANETARY CONFIGURATION

CROSS-REFERENCE TO RELATED APPLICATIONS

This application is a continuation-in-part application to U.S. application Ser. No. 15/460,819 filed Mar. 16, 2017 titled "Guzman transmission", the disclosure of which is hereby incorporated in its entirety at least by reference.

BACKGROUND OF THE INVENTION

1. Field of the Invention

The present invention relates generally to transmissions but more particularly to an infinitely variable transmission embodied in a semi planetary configuration.

2. Description of Related Art

Infinitely Variable Transmissions provide variable and unlimited speed ratios between the power demand and the source of movement. It improves the engine efficiency while reducing the fuel consumption offering new possibilities to angular motion exploitation. Up until today, all conceived transmissions only exploit one vector at a time, by either transforming force into speed or speed into force. When the work parameters of the task to be accomplished demand a change from the original configuration, there are two ways to accomplish this change. Either stop the mechanism, or isolate it from the power source so it can be reconfigured. To accomplish an apparently continuous work, a transmission will use, clutches and synchronized coupling/gear devices for each change in speed/force ratio.

When the values of these vectors change during the movement, it becomes increasingly difficult to maintain the continuity of the flux of these values between vectors.

The actual attempts to develop a real time IVT are based on frictional approaches being the most commonly used the V-Belt CVTs (Continuously Variable Transmissions). The power transmission is achieved through frictional forces, requiring large effective radius, high pulleys clamping pressure and special transmission fluids. It reduces the use of V-belt CVT in light weight vehicles. High torque demands are not possible to use.

BRIEF SUMMARY OF THE INVENTION

In one aspect of the invention, an infinitely variable transmission is provided comprising a first gear set connected to a driving shaft, the first gear set comprising a first sun gear, a a second sun gear, and a first carrier, wherein the first gear set splits the angular motion of the first carrier between the first and second sun gears; and, a second gear set connected with an output shaft, the second gear set comprises a third sun gear and a second carrier, wherein the first sun gear is meshed with the third sun gear, and the second sun gear is meshed with a second carrier.

In one embodiment, the first gear set and the second gear sets are in different or identical vectorial angles. In one embodiment, a geared hydraulic pump with external teeth meshed with the first carrier of the first gear set is provided. In another embodiment, the geared hydraulic pump recirculates oil in a closed loop interfered by a valve. In yet another embodiment, the first carrier turns freely when the valve is open and the first carrier slows due to increased resistance when the valve is closed, such that the motion of second carrier of the second gear set is initiated, accelerating the speed of the output shaft. In one embodiment, the valve is an auto-piloted valve.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide an infinitely variable transmission embodied in a semi planetary configuration.

Figure 1:
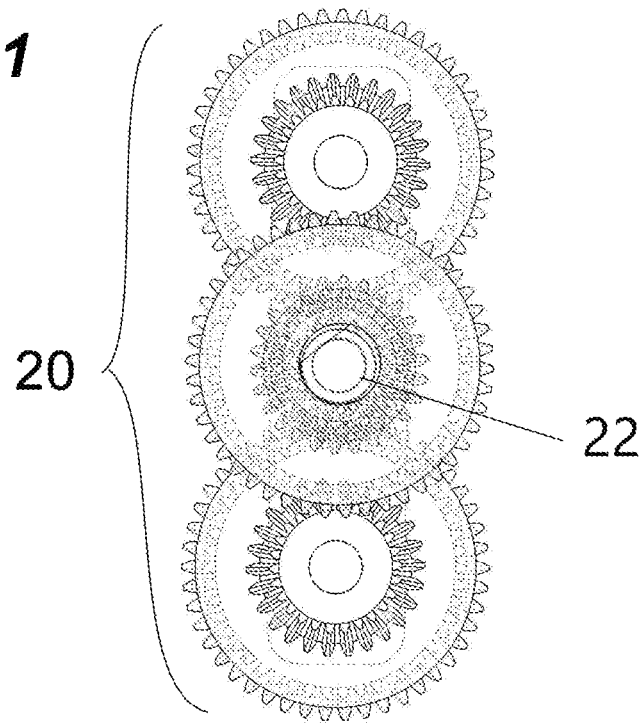
FIG. 1 is a front view of an infinitely variable transmission according to an embodiment of the present invention.
Figure 2:
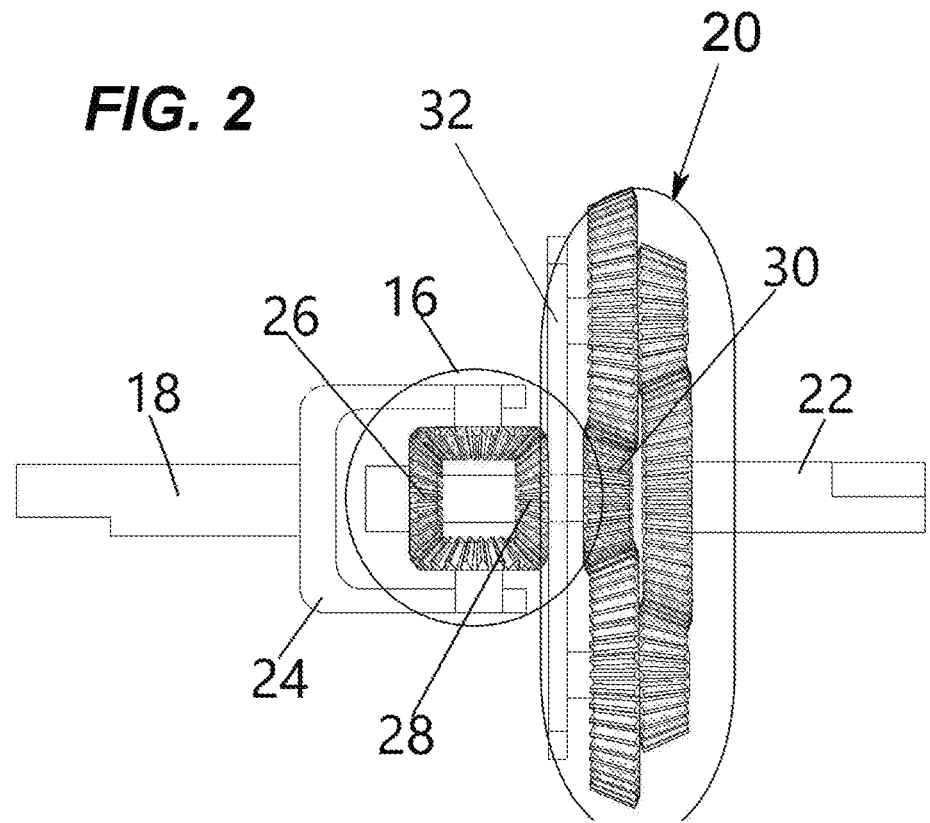
FIG. 2 is a side of the infinitely variable transmission according to an embodiment of the present invention.

Referring to FIGS. 1-2, a first embodiment of an infinitely variable transmission is illustrated. The first embodiment infinitely variable transmission is constructed in a semi planetary configuration, wherein the angular rotation is separated in two exploitable vectors, torque and speed. Advantageously, this transmission has the ability to separate an input vector and displace the contained values in its tangent (the present movement's constant) to change the output values in a constant and instantaneous reciprocal manner. In one embodiment, the first infinitely variable transmission comprises a first gear set 16 and a second gear set 20 having different vectorial angles. This inertial configuration responds to the opposite resistance of the output movement by a translation of the vectors in a reciprocal manner. In this way, an angular input movement outputs an opposite torque proportional to the resistance and develops speed as the resistance diminishes.

In one embodiment, the first gear set is connected to a drive shaft 18 while the second gear set is connected to an output shaft 22. The first gear set splits the angular motion of a first carrier 24 between a first sun gear 26 and a second sun gear 28. The first sun gear is meshed with a third sun gear 30 of the second gear set, and the third sun gear is meshed with a second carrier 32 of the second gear set. Once a motion is initiated, the second carrier opposes more resistance than the third sun gear, so the first sun gear moves while the second sun gear and the second carrier of the second gear set don't move. Once the motion is initiated, and resistance decreases, the second carrier starts rotating to increase the second sun gear speed until it reaches the same speed as the first sun gear, or in this case the maximum source speed.

Advantageously, the present invention may replace much more complex systems like automatic transmissions found on vehicles such as scooters, automatic and differential drive train systems in automobiles and multipurpose vehicles, inertial accumulators, etc.

Figure 3:
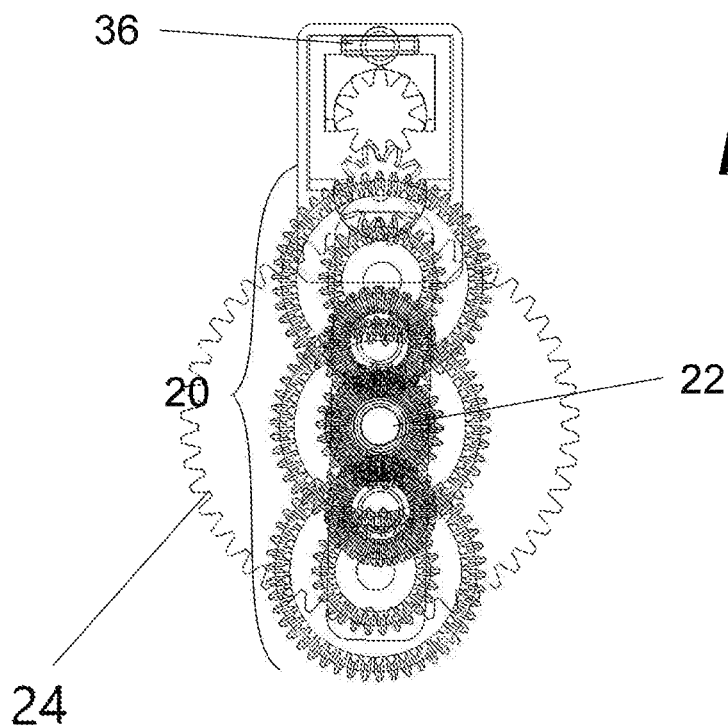
FIG. 3 is a front view of an alternative infinitely variable transmission according to an embodiment of the present invention.
Figure 4:
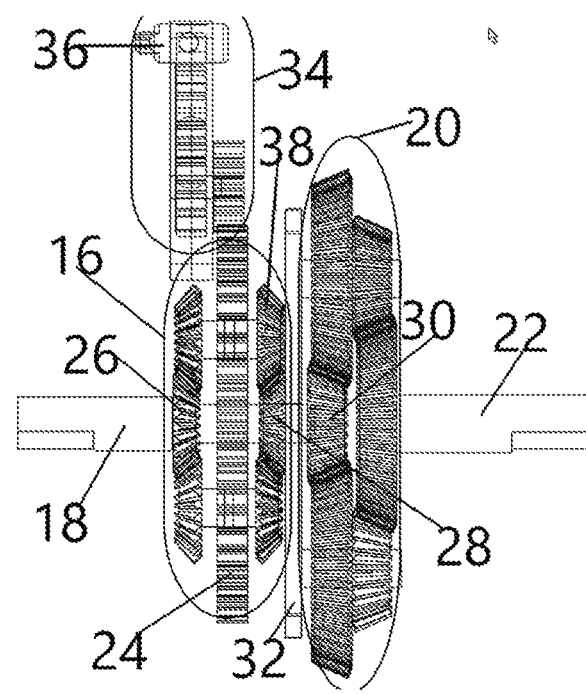
FIG. 4 is a side of the alternative infinitely variable transmission according to an embodiment of the present invention.

Referring now to FIGS. 3-4 a second embodiment of an infinitely variable transmission is illustrated. In one embodiment, the second infinitely variable transmission comprises a first gear set 16 and a second gear set 20 having identical vectorial angles. This dynamic configuration responds to the user's commands by using a hydraulic closed loop as a flow control, which will be described in greater detail below.

In one embodiment, the flow control is a geared hydraulic pump 34 with external teeth drive meshed with a first carrier 24 of the first gear set. In one embodiment, the system recirculates oil in a closed loop interfered via ball valve 36 or similar. When valve 36 is open, the first carrier turns freely. Alternatively, when the valve closes, the loop increases resistance and the first carrier slowdowns the speed, initiating the motion of the second carrier of the second gear set, thus accelerating the output speed. It should be understood, that the process is completely reversible and can be increased until it reaches the zero point, offering all the range of the speed/torque ratio contained in the motion.

Similarly to the first embodiment, the first gear set is driven via shaft 18, and meshed with a second gear set, which is meshed with output shaft 22. The first gear set splits the angular motion of a first sun gear 26 between the first carrier 24 and a second sun gear 28. The first sun gear is meshed with a third sun gear 30 of the second gear set. While, the second sun gear is meshed with a second carrier 32 of the second gear set. Once the motion initiates, the first sun gear transmits the motion to gear 38 meshed among the first carrier with the hydraulic flow control. At the beginning of the motion by leaving the first satellite carrier free, with valve completely open, the second sun gear and the second carrier do not move, providing the initial speed. Once the motion is initiated, loop resistance may be increased by closing valve 36 to slowdown the speed of the first carrier, and start the second sun gear motion, ergo the second carrier increases speed, until it reaches the same speed of the first and third sun gears when the first carrier is completely stopped by the hydraulic flow control, achieving the maximum source speed.

For an automatic system it uses an auto-piloted hydraulic valve that allows a torque sensible response configuring a quasi-ideal automatic transmission. Advantageously, this may replace manual transmissions, automatic dynamic controlled and automatic/manual gearboxes found in cars and trucks.

Advantageously, this invention allows the development of new possibilities for mechanical angular movement. Highly efficient inertial vehicles can be designed because the storage of kinetic energy can then be used with the displacement of its vectors during its trajectory. Further, it acts as a dynamic flux controller that can be fed back inside a mechanical system to obtain an automatic output controller without electronics. Yet, it also offers a solution to the loss of drive suffered by the actual differential systems. For instance, if one of the reciprocal control configuration systems was used in each drive tire (two or four) and calibrated to reach the maximum differential speed needed when the vehicle turns, the system would never reach a total drive loss.

A third embodiment (not shown) enables the reversing of the entire angular motion to the opposite angular movement. It also uses two gear sets with different vectorial angles meshed with two hydraulic flow controls. Each control is meshed with a carrier of each of the gear sets in order to switch the motion between, allowing a forward or reverse output. This embodiment, when combined with any of the other two described hereinabove, allows for the use of the full possibilities existing in an angular motion, including a ratio reduction, over-multiplication, the full range of forward and reverse speeds, neutral and reciprocal blocking (parking).

Advantageously, the present invention offers absolute control of the work source values and allows an optimal exploitation of the sources work potential.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. An infinitely variable transmission comprising:
a first gear set connected to a driving shaft, the first gear set comprising a first sun gear, a a second sun gear, and a first carrier, wherein the first gear set splits the angular motion of the first carrier between the first and second sun gears; and,
a second gear set connected with an output shaft, the second gear set comprises a third sun gear and a second carrier, wherein the first sun gear is meshed with the third sun gear, and the second sun gear is meshed with a second carrier.

2. The infinitely variable transmission of claim 1, wherein the first gear set and the second gear sets are in different or identical vectorial angles.

3. The infinitely variable transmission of claim 1, further comprising a geared hydraulic pump with external teeth meshed with the first carrier of the first gear set.

4. The infinitely variable transmission of claim 3, wherein the geared hydraulic pump recirculates oil in a closed loop interfered by a valve.

5. The infinitely variable transmission of claim 4, wherein the first carrier turns freely when the valve is open and the first carrier slows due to increased resistance when the valve is closed, such that the motion of second carrier of the second gear set is initiated, accelerating the speed of the output shaft.

6. The infinitely variable transmission of claim 4, wherein the valve is an auto-piloted valve.

\* \* \* \* \*